United States Patent [19]

Foley et al.

[11] 4,188,454

[45] Feb. 12, 1980

[54] ORGANO SILANE COUPLING AGENTS OVERCOATED ON ALUMINUM SILICATE COATING ON GLASS FIBERS

[75] Inventors: Kevin M. Foley, Toledo; Homer G. Hill, Newark, both of Ohio

[73] Assignee: Owens-Corning Fiberglas Corporation, Toledo, Ohio

[21] Appl. No.: 877,201

[22] Filed: Feb. 13, 1978

Related U.S. Application Data

[63] Continuation of Ser. No. 612,077, Sep. 10, 1975, abandoned, which is a continuation-in-part of Ser. No. 473,102, May 24, 1974, abandoned.

[51] Int. Cl.$^2$ .............................................. B32B 9/00
[52] U.S. Cl. ..................................... 428/391; 428/378
[58] Field of Search ................. 260/448.8 R; 428/391, 428/378; 106/98

[56] References Cited

U.S. PATENT DOCUMENTS

| | | | |
|---|---|---|---|
| 3,382,083 | 5/1968 | Marsden | 106/98 |
| 3,899,524 | 8/1975 | Foley et al. | 260/448.8 R |

*Primary Examiner*—John D. Welsh
*Attorney, Agent, or Firm*—Kenneth H. Wetmore; James B. Wilkens; William P. Hickey

[57] ABSTRACT

Organo silane coupling agents having at least two hydrolyzable silane groups are disclosed. Glass fibers coated with these organo silanes are suitable for reinforcing cementitious materials.

9 Claims, No Drawings

ORGANO SILANE COUPLING AGENTS OVERCOATED ON ALUMINUM SILICATE COATING ON GLASS FIBERS

This is a continuation of application Ser. No. 612,077, filed Sept. 10, 1975 which is a continuation-in-part of application Ser. No. 473,102, filed May 24, 1974, now both abandoned.

This invention relates to silane coupling agents. It also relates to glass fibers coated with the coupling agents. The coated fibers are suitable for reinforcing cementitious materials.

In the past, the use of glass fibers for long term (5 or more years) reinforcement of cementitious materials having a high alkali content has had limited success. The harsh alkali environment degrades the types of glass fibers commonly used to reinforce plastics. This alkali attack and subsequent fiber strength loss generally so weakens the fibers that long term reinforcement of a cementitious matrix by such fibers is neither predictable nor dependable.

To remedy this situation the prior art has tried a number of potential solutions. One is to coat the fibers with some material that is alkali resistant. Epoxy resin coated fibers, for example, generally with withstand alkali attack. Another potential solution is to use a high alumina cement which has less alkali content. Still another solution is to formulate a glass composition which in fiber form will be resistant to alkali attack.

We now have discovered organo silanes containing at least two hydrolyzable silane groups. We believe that the distance between any two hydrolysis cites on a glass fiber is greater than the distance between any two hydrolyzable silane groups in the organo silanes of this invention. Hence, the organo silane only sees one hydrolysis cite on the glass fiber. This necessarily frees up at least one hydrolyzable silane to bond to a hydrolysis cite in a cementitious matrix.

Accordingly, an object of this invention is to provide organo silanes containing at least two hydrolyzable silane groups.

Another object is to provide glass fibers coated with these organo silanes.

Still another object is to provide cementitious materials reinforced with the coated glass fibers.

Other objects, aspects, and advantages of this invention will be apparent to one skilled in the art from the following disclosure and appended claims.

The organo silanes of this invention contain at least two hydrolyzable silane groups. These silanes are represented by the following formula:

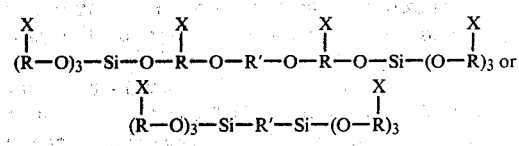

wherein each R is an alkyl radical having 1 to 10 carbon atoms, each X is hydrogen, chlorine, bromine, fluorine or iodine, and each R' is an alkyl or mercaptoalkyl radical having 1 to 10 carbon atoms, a cycloalkyl radical having 3 to 10 carbon atoms, an aryl radical having 6 to 20 carbon atoms, an aralkyl radical having 7 to 20 carbon atoms,

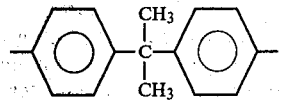

or combinations thereof. Preferably each R is an alkyl radical having 1 to 5 carbon atoms, each X is hydrogen or chlorine, and each R' is an alkyl or mercaptoalkyl radical having 1 to 5 carbon atoms, a cycloalkyl radical having 6 to 10 carbon atoms, an aryl radical having 6 to 12 carbon atoms, an aralkyl radical having 7 to 15 carbon atoms,

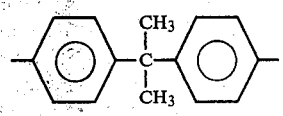

or combinations thereof.

Specific examples of aryl and aralkyl radicals include phenyl, naphthyl, tolyl xylyl, phenylethyl, and the like. Specific examples of these silanes are:

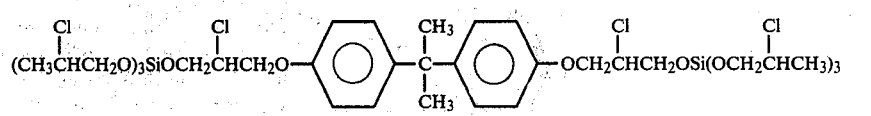

1.

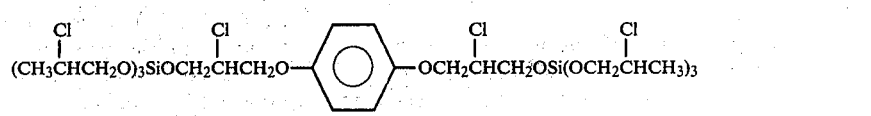

2.

3.

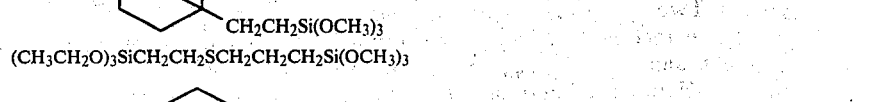

4.

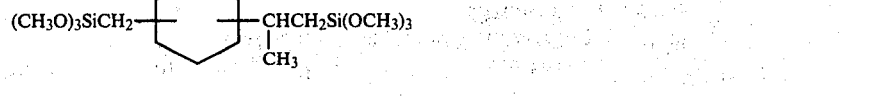

5.

6.

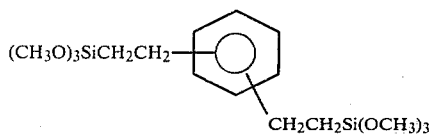

7.

We employ various methods to produce these organo silanes. For example, heating a mixture of vinyltriethoxysilane and gamma-mercaptopropyltrimethoxysilane produces silane no. (5). We prepare silane no. (3) by first reacting vinyltrichlorosilane with trichlorosilane in the presence of a platinum catalyst and then reacting the reaction product with a mixture of methanol in pentane. The latter reaction is exothermic.

Any commercially available glass fibers, such as those produced from E glass, can be used in the practice of this invention. However, we prefer to use alkali-resistant glass fibers, especially calcium hydroxide resistant glass fibers.

Alkali-resistant glass fibers that can be employed include those disclosed in British Pat. Specifications Nos. 1,243,972 and 1,290,528 and in U.S. Patent Application Ser. No. 275,613 filed on July 27, 1972. The $ZrO_2$ and $TiO_2$ containing compositions described in application Ser. No. 275,613 provide a unique combination of alkali resistance, low liquidus temperature, and desirable viscosity for the fiberization of glass compositions and for the reinforcement of cementitious materials. The glass compositions of application Ser. No. 275,613 have the following range of proportions by weight: $SiO_2$, 60 to 62%; CaO, 4 to 6%; $Na_2O$, 14 to 15%; $K_2O$, 2 to 3%; $ZrO_2$, 10 to 11%; and $TiO_2$, 5.5 to 8%.

E glass is a textile glass composition used for many years for the reinforcement of non-alkali matrices such as plastics. It is well known for its properties which allow it to be easily and economically fiberized in commercial quantities and at commercial rates using direct melt furnaces and fiberizing techniques. Typically, E glass has the following composition in percent by weight:

| Ingredient | E glass |
| --- | --- |
| $SiO_2$ | 54.6 |
| $Al_2O_3$ | 14.5 |
| CaO | 18.0 |
| MgO | 4.0 |
| $B_2O_3$ | 6.9 |
| $Na_2O$ | 0.4 |
| $TiO_2$ | 0.6 |
| $F_2$ | 0.6 |
| $Fe_2O_3$ | 0.4 |

The coated glass fibers of this invention can be successfully used as a reinforcing material in various cementitious products or matrices including cement, Portland cement, concrete, mortar, gypsum, and hydrous calcium silicate.

The term hydrous calcium silicate denotes crystalline compounds formed by the reaction of lime (CaO), silica ($SiO_2$), and water. Two hydrous calcium silicates generally of interest are: tobermorite, having the formula $4CaO.5SiO_2.5H_2O$; and zonotlite having the formula $5CaO.5SiO_2.H_2O$. Hydrous calcium silicate products often are used as heat insulation materials.

The coated glass fibers of this invention can be used alone or in combination with asbestos fibers, mineral wool, or organic fibers such as wood fibers in the production of cementitious products, especially calcium silicate products.

The organic materials are cellulosic type materials such as pulp fiber, cotton, straw, bagasse, wood flour, hemp, rayon, coir fiber, and the like.

We apply a uniform coating or layer of the organo silane to the surface of the glass fibers. By the expression "uniform coating or layer" we mean that all points on the surface of the glass fibers are covered with a coating at least monomolecular in thickness. The uniform coating can be applied by spraying, dipping, brushing, or the like. A uniform coating is essential when the glass fiber is to be used in a hostile environment. An uncoated area on the glass fiber surface would be subject to alkali attack at the unprotected spot. This would result in destruction of the fiber and the end of the fiber's utility as a reinforcing agent in a cementitious medium. The amount of organo silane on the surface of the glass ranges from 0.001 to 10.0% by weight of glass and silane. Preferably, the amount of organo silane ranges from 0.003 to 5.0%. In actual practice the only limit to the upper concentration is economics. A monomolecular layer is sufficient to provide the protection required. Multiple layers are unnecessary and wasteful.

Present technology allows for the production of glass fibers having a diameter ranging from 0.0001 inch to 0.0004 inch at a rate of 10,000 feet to 15,000 feet per minute Glass fibers are produced from small streams of molten glass which exude through tiny orifices located in what is called a bushing. Typically, bushings have 204 such orifices. The tiny streams of molten glass which issue from the bushing are attenuated by pulling the fibers until the diameters given above result, and during which time the streams cool and solidify into what are called filaments.

A further advantage of using the organo silanes of this invention is the variety of means of application which can be employed. The solution may be applied at the bushing to the bare glass fibers before they are gathered into a strand. The application may be deferred until the glass fibers are gathered into a strand thereby applying the solution to be bare strand. Alternatively the solution may be applied to a strand which has been treated previously with a coating composition. Another option is to use the silanes as a component with other coating compositions. This mixture of coating compositions may be applied using any of the above-described means. The coated strand may be dried before collection as a package by passing it through a tube furnace. Alternatively, the coated strand may be wound and collected as a package and then placed in an oven for drying.

In the past, asbestos fibers have been very successful as a reinforcement for many types of inorganic matrices because of their characteristics and ability of the asbestos fibers to disperse and to provide some entangled network. The entangled network is generally thought to be due to the non-uniformity of the length of the asbestos fibers, ranging anywhere from 1/16 inch to 4 inches in length. In order to employ glass fibers as a suitable replacement for asbestos fibers, it is generally thought that some of the characteristics possessed by the asbestos fibers should be obtained with glass fibers. For this reason the length of the glass fibers may range from ⅛ inch to about 2 inches in length and preferably from ½ inch to 1 inch in length in order to obtain some entanglement of the glass fibers upon dispersion of the glass fibers in the inorganic matrix. Furthermore, many inorganic matrices are susceptible to crack propagation. By the use of these longer fibers the fibers traverse the cracks thereby adding strength to the matrix. Blends of various lengths of glass fibers also can be employed.

If desired, other sizings, silanes, lubricants, and the like also can be applied to the glass fibers.

The advantages of this invention are illustrated by the following examples. The reactants, proportions, and other specific conditions are presented as being typical and should not be construed to limit the invention unduly.

EXAMPLE I

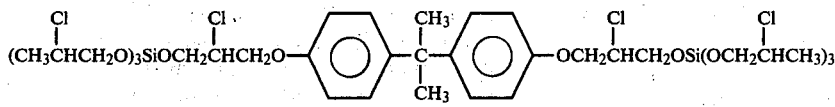

was prepared by reacting 3 moles of propolyene oxide, 1 mole of silicon tetrachloride, and 0.5 mole of

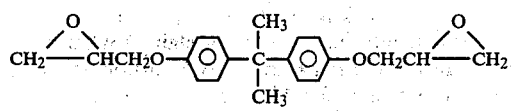

at a temperature of 175° F. for a time of 16 hours.

EXAMPLE II

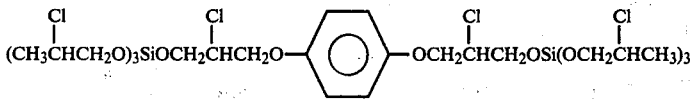

was prepared according to the procedure of Example I except that the propylene oxide and silicone tetrachloride were reacted with 0.5 mole of:

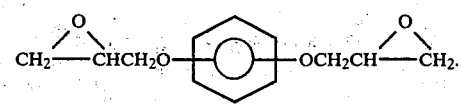

EXAMPLE III

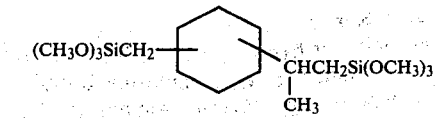

was prepared by reacting 0.75 mole of d-limonene, 1.6 moles of trichlorosilane and 1 ml of a solution containing 10 grams of chloroplatinic acid in 150 ml of isopropanol. This was heated to reflux for 3 days. The reflux temperature rose to 179° C. Five hundred ml of pentane then were added to the reaction, followed by a solution of 5.82 moles of methanol in 100 ml of pentane. This was distilled giving 145 grams of material boiling from 100° to 200° C. at 2 mm of mercury.

EXAMPLE IV $(CH_3O)_3$ Si $CH_2$ $CH_2$ Si $(OCH_3)_3$ was prepared according to the procedure of Example III except that 1.5 mole of vinyltrichlorosilane was employed in place of d-limonene.

EXAMPLE V

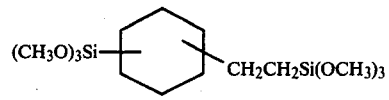

was prepared according to the procedure of Example III except that 4 vinylcyclohexane was employed in place of d-limonene.

EXAMPLE VI $(CH_3CH_2O)_3SiCH_2CH_2SCH_2CH_2CH_2Si(OCH_3)_3$ was prepared by reacting 2.28 moles of vinyltriethoxysilane and 2.28 moles of gamma-mercaptopropyltrimethoxysilane. The reaction was heated to 150° C. and maintained at that temperature. After 48 hours the reaction was stopped.

EXAMPLE VII

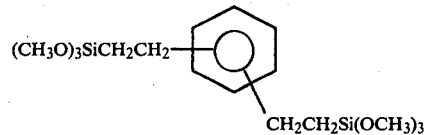

was prepared by reacting 2 moles of vinyltrichlorosilane, 1 mole of benzene and a small amount of aluminum chloride. This was heated to reflux for 1 day. One thousand ml of pentane then were added to the reaction. This was followed by a solution of about 6 moles of methanol in 100 ml of pentane. The product can be used as is or distilled.

EXAMPLE VIII

Glass fibers were formed from the following glass composition.

| Ingredients | Weight Percent |
|---|---|
| $SiO_2$ | 61.1% |

-continued

| Ingredients | Weight Percent |
|---|---|
| CaO | 5.1% |
| Na$_2$O | 14.4% |
| K$_2$O | 2.6% |
| ZrO$_2$ | 10.4% |
| TiO$_2$ | 6.0% |

The fibers were gathered together as strands and passed through a bath of the silane of Example VII. While still wet, the coated strands were passed through an aqueous bath of 10% solids of aluminum silicate. The strands then were passed through a tube furnace heated to 500° F. The furnace was 4 feet in length and a strand requires 10 to 30 seconds to pass through it. The strands were dry upon exit and the resulting coatings were at least monomolecular in thickness. Upon exit from the furnace the strands were collected and wound to form a package.

EXAMPLE IX

The process of Example VIII was repeated except that the silane of Example III was employed instead of the silane of Example VII and that the aluminum silicate bath was not employed.

EXAMPLE X

Various samples of the coated glasses of Examples VIII and IX and bare glass strands (control) were tested as follows. A layer of cement about ⅜" thick was applied to a tongue depressor. The cement has a water/cement ratio of 0.33. One-half inch of a length of glass strand is emersed about half way into the wet cement. A tail is left protruding. The cement then was cured at 100% relative humidity for the time indicated in the following table. The samples were mounted in an Instron and the glass strand was broken or pulled out of the cement. The break or pullout loads ranged from about 5 to 16 pounds. A high percentage of breaks indicates good coupling between the glass and cement. A low percentage of breaks indicates pullout and poor coupling between the glass fiber and cement. The results were as follows:

| | Percentage of Breaks | | |
|---|---|---|---|
| Time, Weeks | Pare Glass (control) | Silane (Ex. VIII) | Silane (Ex. IX) |
| 1 | 30 | 100 | —* |
| 2 | 45 | 100 | 83 |
| 4 | 49 | 100 | —* |
| 16 | 61 | 100 | —* |

*not carried out.

This data reveals the marked advantage of the silane coupling agents of this invention. Glass fibers coated with these coupling agents are very suitable for reinforcing cementitious materials.

While the invention has been described in considerable detail, we do not wish to be limited to the particular embodiments shown and described; and it is our intention to cover hereby all novel adaptations, modifications, and arrangements thereof which come within the practice of those skilled in the art to which the invention relates.

We claim:

1. A cementitious product comprising: a composite of reinforcing materials and a cementitious matrix wherein one of the reinforcement materials is glass fibers having on their surfaces a uniform coating of organo silanes, containing at least two hydrolyzable silane groups represented by the formula:

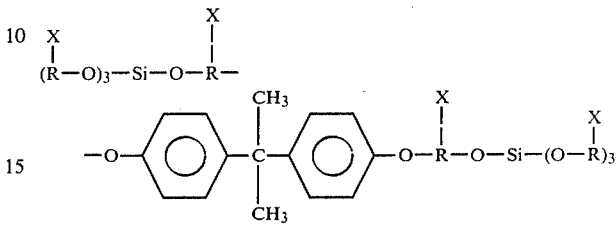

wherein each R is an alkyl radical having 1 to 10 carbon atoms and each X is hydrogen, chlorine, bromine, fluorine, or iodine, and a coating of aluminum silicate between the organo silane coating and the cementitious matrix.

2. The cementitious product of claim 1 wherein said cementitious matrix is Portland cement.

3. The cementitious product of claim 1 wherein said cementitious matrix is hydrous calcium silicate.

4. The cementitious product of claim 1 wherein said cementitious matrix is concrete.

5. The cementitious product of claim 1 wherein said cementitious matrix is cement.

6. The cementitious product of claim 1 wherein said cementitious matrix is mortar.

7. The cementitious product of claim 1 wherein each R is an alkyl radical having 1 to 5 carbon atoms, and each X is hydrogen or chlorine.

8. A cementitious product comprising: a composite of reinforcing materials and a cementitious matrix wherein one of the reinforcement materials is glass fibers having on their surfaces a uniform coating of an organo silane having the following formula:

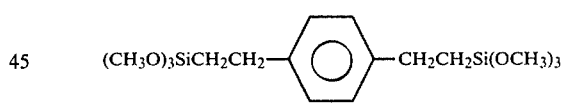

and a coating of aluminum silicate between the organo silane coating and the cementitious matrix.

9. A cementitious product comprising: a composite of reinforcing materials and a cementitious matrix wherein one of the reinforcement materials is glass fibers having on their surfaces a uniform coating of organo silane containing at least two hydrolyzable silane groups of the formula:

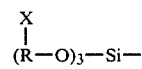

wherein each R is an alkyl radical having 1 to 10 carbon atoms and each X is hydrogen, chlorine, bromine, fluorine, or iodine, and a coating of aluminum silicate between the organo silane coating and the cementitious matrix.

* * * * *